United States Patent [19]

Pearce et al.

[11] 4,454,561

[45] Jun. 12, 1984

[54] ELECTRICAL COMPONENT HAVING A RESISTANCE ELEMENT

[75] Inventors: Godfrey R. Pearce, Glasgow, Ky.; William J. Evans, Indianapolis, Ind.

[73] Assignee: Emhart Industries, Inc., Indianapolis, Ind.

[21] Appl. No.: 402,153

[22] Filed: Jul. 26, 1982

[51] Int. Cl.³ .............................................. H01G 1/11
[52] U.S. Cl. .................................................... 361/275
[58] Field of Search ........................................ 361/275

[56] References Cited

U.S. PATENT DOCUMENTS

| Re. 27,824 | 11/1973 | Cox | 361/323 X |
| 3,248,617 | 4/1966 | Hynes et al. | 361/275 X |
| 3,302,081 | 1/1967 | Grahame | 361/275 |
| 3,304,473 | 2/1967 | Netherwood et al. | 361/275 X |

FOREIGN PATENT DOCUMENTS 2801433  7/1978  Fed. Rep. of Germany ...... 361/275

Primary Examiner—Donald A. Griffin
Attorney, Agent, or Firm—Robert F. Meyer

[57] ABSTRACT

An electrical component of the type including a housing, a component element located within the housing, and at least a pair of electrical connectors coupled to the component element and electrically accessible from outside of the housing, provides a resistive element electrically contacting both of the connectors and including a predetermined, finite electrical resistance for forming an electrical path of known resistance between the connectors.

6 Claims, 2 Drawing Figures

ELECTRICAL COMPONENT HAVING A RESISTANCE ELEMENT

BACKGROUND OF THE INVENTION

1. Field of the Invention

The present invention generally relates to electrical components and, in particular, to passive electrical components which include more than one type of integral reactive element.

2. Statement of the Prior Art

Manufacturers of electrical and electronic components and circuitry are generally involved in a continual effort to reduce the size and manufacturing costs of the components and circuitry for purposes of improving volumetric and cost efficiencies. This is true for discrete components as well as for integrated circuitry.

SUMMARY OF THE INVENTION

Accordingly, the present invention provides an electrical component of the type including a housing, a component element located in the housing, and at least a pair of electrical connector means coupled to the component element and electrically accessible from outside of the housing, wherein the improvement comprises a resistive element electrically contacting both of the connector means and including a predetermined, finite electrical resistance means for forming an electrical path of known resistance between the connector means.

BRIEF DESCRIPTION OF THE DRAWINGS

The present invention is illustratively described in reference to the accompanying drawings in which.

DETAILED DESCRIPTION OF THE DRAWINGS

Figure 1:
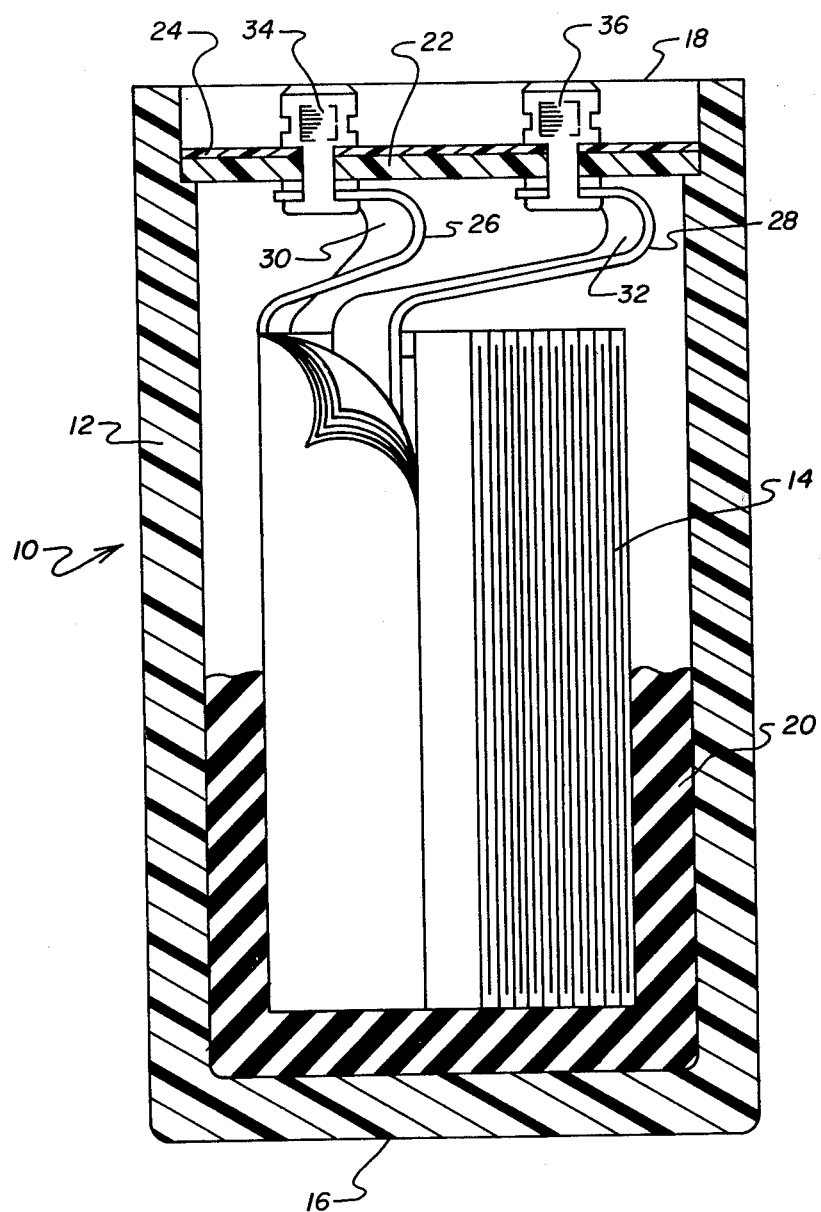
FIG. 1 is a partially sectioned view of a capacitor constructed in accordance with one embodiment of the present invention.

FIG. 1 generally shows an electrical component or capacitor 10 including a housing 12 and a component element 14. The element 14 shown is a capacitor element or an electrode roll. The housing 12 is made from a phenolic resin and is elongated, being closed at one end 16 and open at the other end 18. The component element 14 is located within the housing 12 and is held in place by a potting compound 20 such as asphalt wax.

The housing 12 is closed by a cover 24. A resistive element 22 is affixed to the cover 24 and forms a part thereof. The cover 24 may be made from a phenolic laminate. The resistive element 22 is made from an elastomeric element which is generally an electrical insulator. The material used is an ethylene propylene copolymer to which is added a specific amount of carbon black. The carbon black gives the copolymer electrical conductivity, the amount of which is determined by the amount of materials mixed. The mixed material which is used to make the resistive element 22 is manufactured by the B. F. Goodrich Company. It is made to specification for resistivity and then formed into the sizes and shapes necessary for use in the components of the present invention.

The capacitor 10 also includes a pair of electrical connectors 26 and 28, which at one end include flexible capacitor connector tabs 30 and 32, respectively. The connector tabs are connected to separate electrodes of the capacitor electrode roll. The other ends of the electrical connectors 26 and 28 include electrical terminals 34 and 36, respectively. Terminals 34 and 36 are connected to connector tabs 30 and 32, respectively. The terminals 34 and 36 are mounted to the resistive element 22 and cover 24 and pass through to be electrically accessible from outside of the housing 12. The electrical contact formed between the resistive element 22 and the connectors 26 and 28 creates a parallel resistance capacitance circuit within the component 10.

The amount of resistance or conductance exhibited by the element 22 will be determined by the mixture of materials within the element, as discussed above, and also by the physical dimensions of the element formed. Thus, any determination of the resistance of the element will require consideration of the actual form that the element will take. As an example, an element similar to 22 in FIG. 1 was constructed with a circular shape, approximately one-eighth ($\frac{1}{8}$) inch thick with the connectors 26 and 28 approximately 0.65 inches apart. It exhibited a resistance of approximately 25,000 ohms between connectors 26 and 28.

Figure 2:
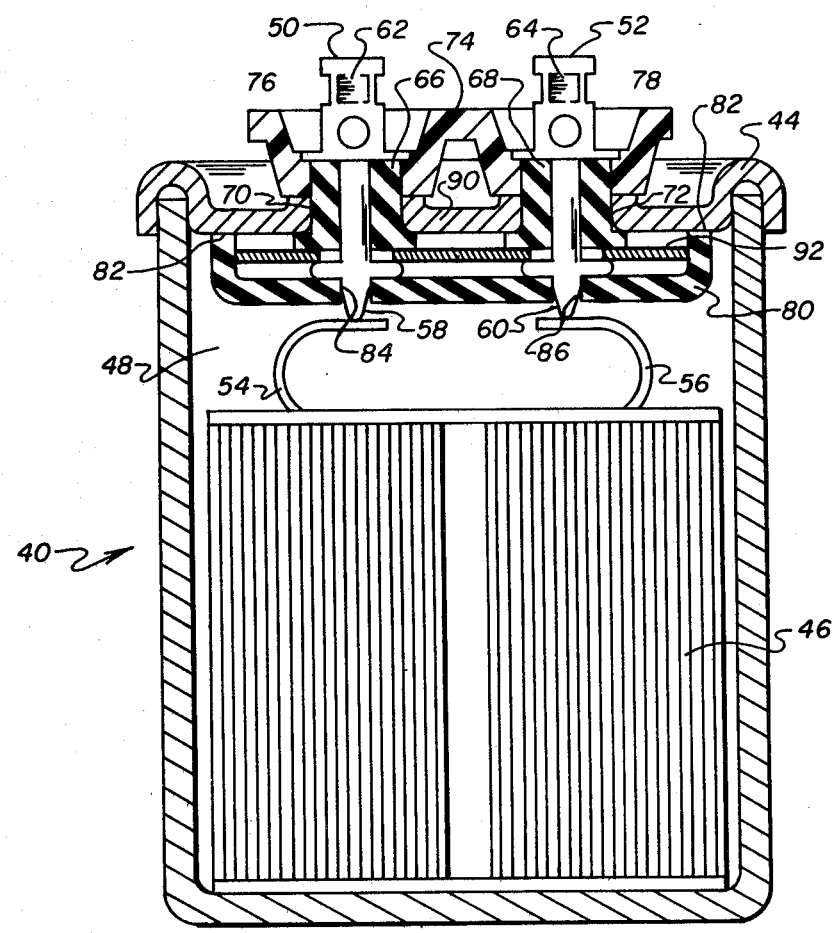
FIG. 2 is a partially sectioned view of another capacitor constructed in accordance with another embodiment of the present invention.

FIG. 2 shows a cross sectional view of another electrical component or capacitor 40 constructed in accordance with an embodiment of the present invention. The capacitor 40 is an oil filled type generally including a housing 42 with a cover 44 enclosing an electrode foil roll 46. By the end of manufacturing of the capacitor 40, the open space 48 shown therein is generally filled with an insulating oil. The capacitor 40 also includes a pair of electrical connectors generally referred to as 50 and 52. Connectors 50 and 52 include at their lower ends a pair of flexible electrode connector tabs 54 and 56, respectively. Connector tabs 54 and 56 are connected to separate electrodes of the electrode roll 46. The upper ends of connector tabs 54 and 56 are coupled to a pair of terminal studs 58 and 60, respectively. The connector studs 58 and 60 extend from the inside of the housing 42, and though the cover 44 to be accessible from the outside thereof, coupled to the upper ends of studsa 58 and 60 air a pair of terminals 62 and 64, respectively. The studs 58 and 60 are mounted by a pair of resistive elements of bushings 66 and 68, respectively. The busings 66 and 68 are made of the same material as the resistive element. The bushings 66 and 68 are mounted within holes of the cover 44. Because the cover 44 is generally constructed of an electrically conductive metal, the combination of the cover 44 with the bushings 66 and 68 forms a path of known resistance between the studs 58 and 60. An insulator 74 partially covers the terminals 62 and 64 and all of the bushings 66 and 68 extending past the cover 44. This prevents further electrical contact from being established between the bushings 66 and 68 and thus changing the resistance between the studs 58 and 60.

The capacitor 40 also includes a circuit interrupter for the purpose of preventing catastrophic capacitor failure in the event of overheating of the capacitor. The circuit interrupter generally includes a bridge member 80 which is coupled around its periphery 82 to the cover 44. The bridge 80 makes contact with the cover 44 in proximity with the housing 42. The bridge member 80 is constructed of insulating material and includes a pair of holes 84 and 86 through which the studs 58 and 60 extend. Below the holes 84 and 86, the studs 58 and 60 are are connected to the connector tabs 54 and 56. One possible method for forming this connection is by spot welding. In the event of overheating of the capacitor 40, it is most likely that gas bubbles will be formed in the accompanying oil which will increase the pressure within the housing 42. This will cause the cover 44 which is generally flexible to bulge upwardly primarily across its central portion 90. This will cause the studs 58 and 60 to be pulled upwardly through the holes 84 and 86 of bridge member 80, which is generally rigid in respect to the flexibility of color 44. As the studs 58 and 60 are pulled through the bridge member 80, the connector tabs 54 and 56 engage the bottom of bridge member 80 and further upward pulling of the studs 58 and 60 will cause disconnection of either one or both of the studs from their respective connector tabs. This disconnects power to the electrode roll 46 which prevents substantial further gas generation and thus prevents any oil or gas from destructively escaping from the housing 42. A paper insulator 92 is located between the cover 44 and stud flanges 94 and 96 to prevent shorting therebetween during the disconnect process.

Thusly constructed, the electrical component of the present invention provides a single component capable of performing the functions of a pair of components but only requiring the space and assembly time for a single component. In this manner, the often combined circuit elements of capacitor and resistor can be combined during component manufacturing instead of during circuit assembly.

The embodiments of the present invention which are described above are intended to be taken in an illustrative and not a limiting sense. Various modifications can be made to the above embodiments by persons skilled in the art without departing from the scope of the present invention as described in the appended claims.

What is claimed is:

1. In an elecrical component of the type including a housing, a component element located within said housing, and at least a pair of electrical connector means coupled to said component element and electrically accessible from outside of said housing, wherein the improvement comprises a resistive element including a mixture of carbon black and an ethylene propylene copolymer integral with said housing and electrically contacting both of said connector means, said resistive element including a predetermined, finite electrical resistance means including the material composition of said resistive element for forming an electrical path of known resistance between said connector means.

2. The improvement of claim 1, wherein said resistive element includes means for physically positioning said connector means with respect to said housing.

3. The improvement of claim 1, wherein said electrical component is a capacitor and the inclusion of said resistive element thereby forms a parallel resistance-capacitance circuit.

4. The improvement of claim 1, wherein said housing is elongated having an open end from which said electrical connector means extend and further wherein said resistive element includes means for physically positioning said connector means with respect to said housing and said open end.

5. The improvement of claim 4, wherein said resistive element is part of a closure of said open end of said housing.

6. The improvement of claim 4, wherein said housing includes a cover for closing said open end and further wherein said resistive element includes means for mounting said connector means on said cover.

* * * * *